Jan. 22, 1957 R. HIRSCHSON 2,778,321
MACHINE FOR THE AUTOMATIC MOULDING AND
AUTOMATIC DELIVERY OF ICE CREAM
Filed Jan. 2, 1953 7 Sheets-Sheet 1

Inventor:
R. Hirschson

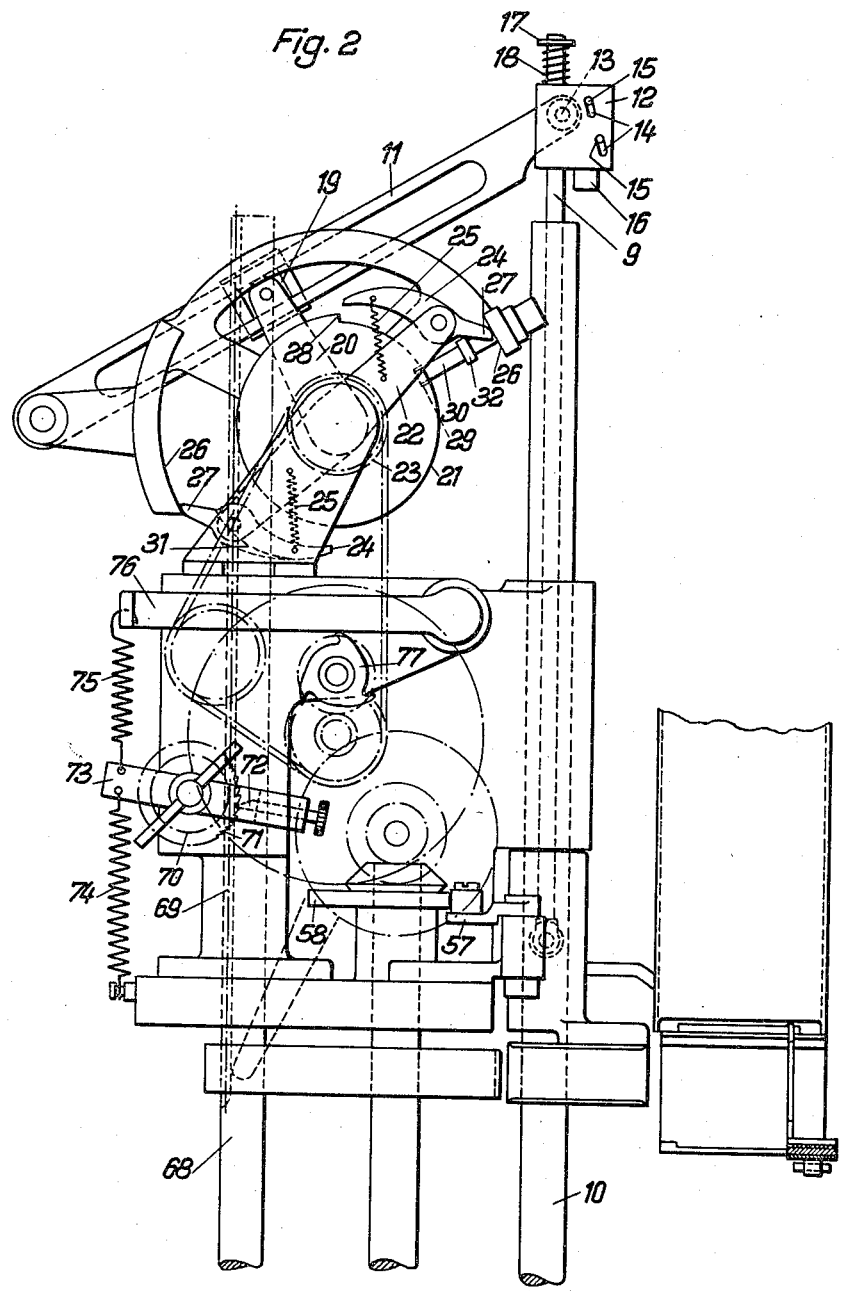

Jan. 22, 1957 R. HIRSCHON 2,778,321
MACHINE FOR THE AUTOMATIC MOULDING AND
AUTOMATIC DELIVERY OF ICE CREAM
Filed Jan. 2, 1953 7 Sheets-Sheet 3

Inventor:
R. Hirschon

Jan. 22, 1957 R. HIRSCHON 2,778,321
MACHINE FOR THE AUTOMATIC MOULDING AND
AUTOMATIC DELIVERY OF ICE CREAM
Filed Jan. 2, 1953 7 Sheets-Sheet 4
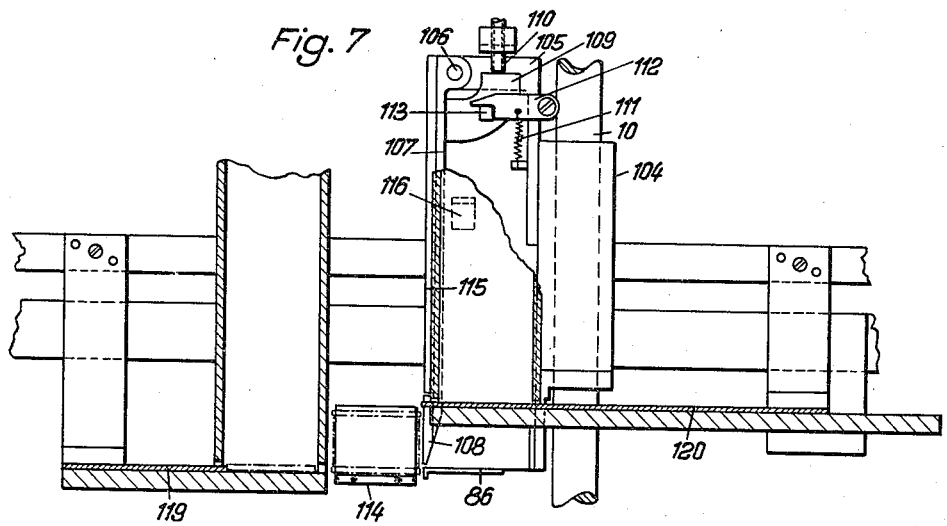
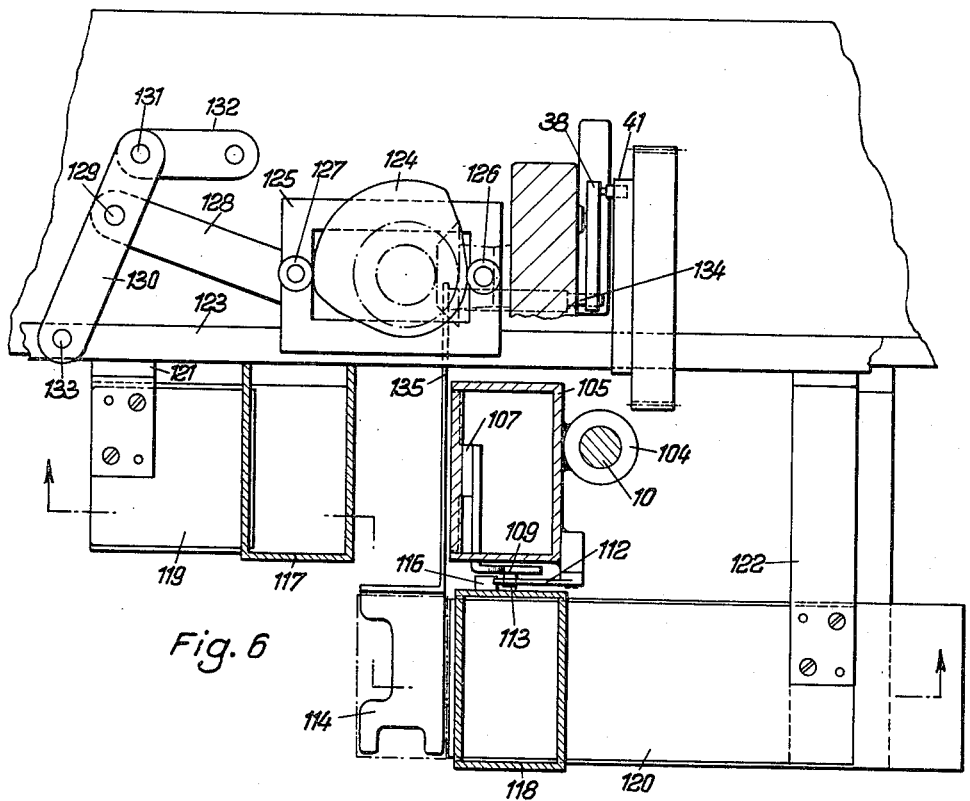
Inventor:
R. Hirschon Jan. 22, 1957 R. HIRSCHSON 2,778,321
MACHINE FOR THE AUTOMATIC MOULDING AND
AUTOMATIC DELIVERY OF ICE CREAM
Filed Jan. 2, 1953 7 Sheets-Sheet 5
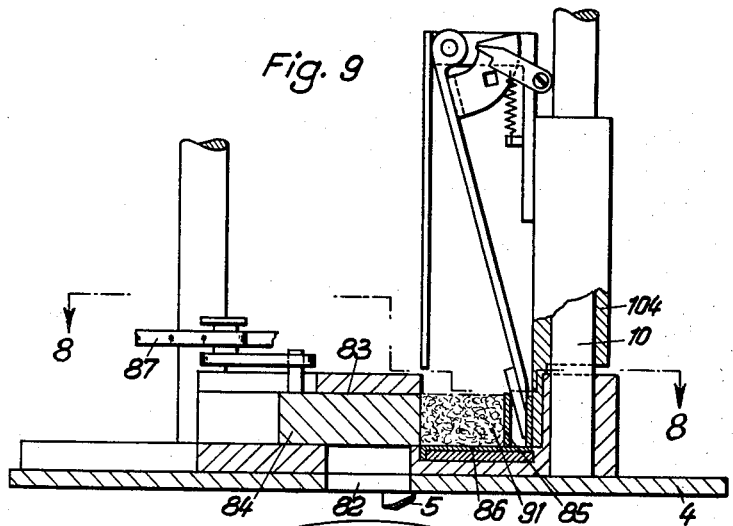
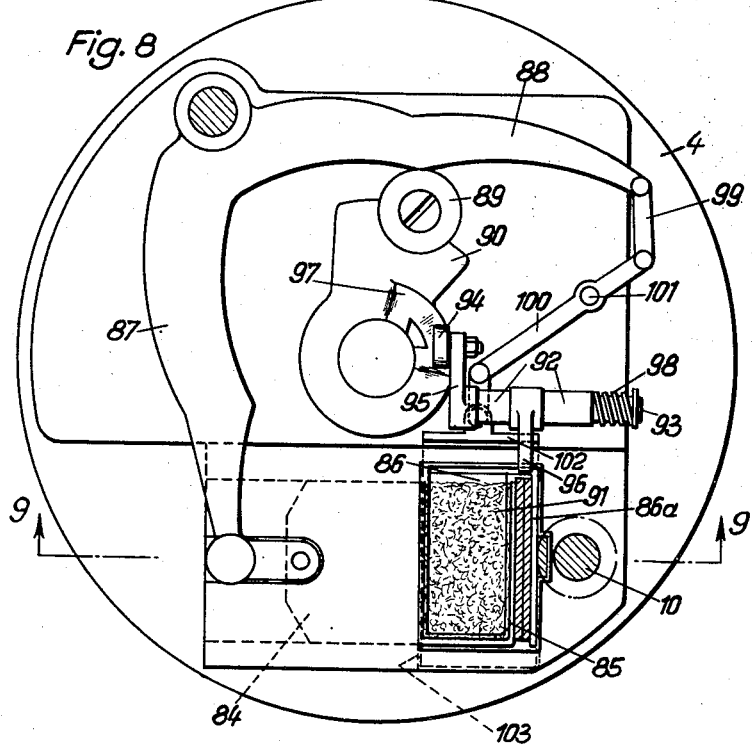
Inventor:
R. Hirschson Jan. 22, 1957  R. HIRSCHON  2,778,321
MACHINE FOR THE AUTOMATIC MOULDING AND
AUTOMATIC DELIVERY OF ICE CREAM
Filed Jan. 2, 1953  7 Sheets-Sheet 7
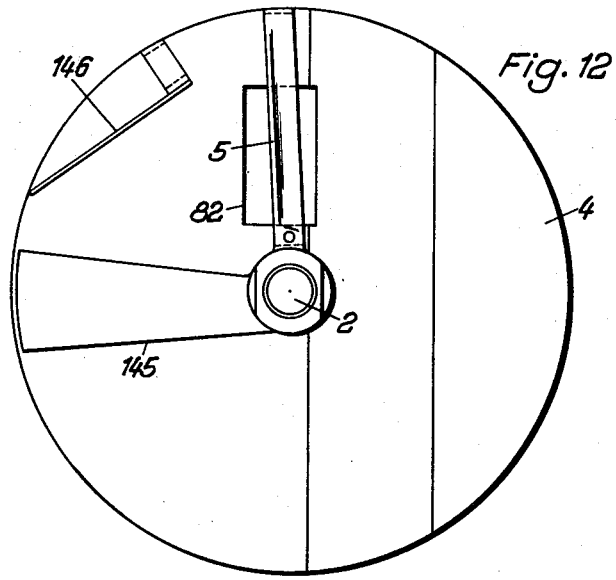
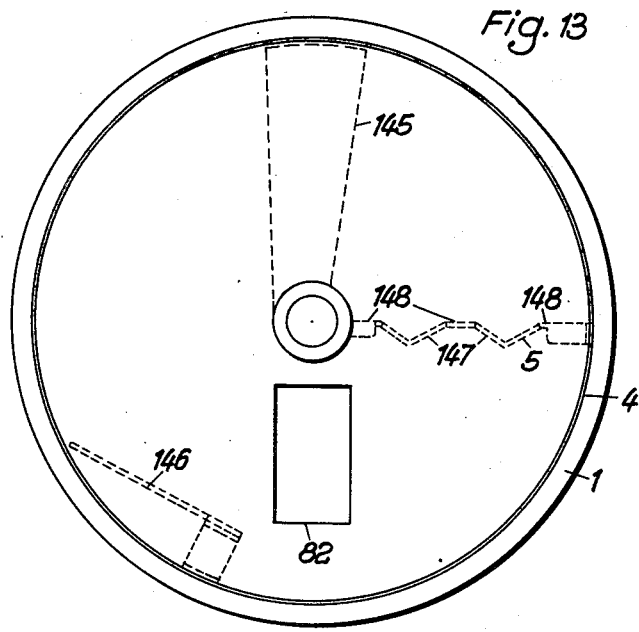
Inventor:
R. Hirschon United States Patent Office 2,778,321
Patented Jan. 22, 1957

2,778,321

MACHINE FOR THE AUTOMATIC MOULDING AND AUTOMATIC DELIVERY OF ICE CREAM

Richard Hirschson, Hannover, Germany

Application January 2, 1953, Serial No. 329,361

27 Claims. (Cl. 107—1)

The invention relates to a machine for the automatic moulding and automatic delivery of ice cream, preferably one in which the moulded piece of ice cream is provided with covering wafers. In this machine the moulded pieces of ice cream are transported by a feeder device from a lower lying ice cream storage container to a delivery opening lying on a higher level. Difficulties arise in machines of this kind primarily due to the tendency of the moulded piece of ice cream to stick to all surfaces coming into contact with it due mainly to the temperature variation occuring between the ice storage container and the delivery opening, but also to some extent owing to its particular consistency. This tendency to stick renders it difficult to detach the moulded piece from said surface without deformation.

The invention has the object of overcoming these difficulties and consists essentially of a machine for the moulding and delivery of ice cream comprising in combination a bulk storage receptacle for the ice cream, a stationary scraper device operating to transfer ice cream from the bulk storage to a movable mould, means for carrying the charged mould to a position remote from the moulding position and to transfer the moulded ice cream into register with wafer biscuit containing magazines, means for transferring wafer biscuits to the top and bottom surfaces of the moulded ice cream piece and means for discharging the completed ice cream sandwich to the purchaser.

A further object of the invention is the provision of a lifting member for raising the ice cream that will be very quickly returned to its original position adjacent the mould so as to be maintained at a temperature close to that of the ice cream delivered to it in order to reduce the tendency of the ice cream to stick.

A still further object is to provide means to expel material that may prevent return of the lifting means to its original position.

Yet another object of the invention is the provision of following means by which the mould is at all times in direct contact with the surface of the bulk of ice cream and to provide lifting means that will operate uniformly as the level of the bulk of ice cream varies.

Another object of the invention is to provide a hygienic device for delivering a neat block of ice cream between two wafers, to a receiver to which a purchaser has ready access.

A still further object of the invention is to provide means in an ice cream sandwich dispensing device, which prevent the wafers used to hold the ice cream from becoming moist, due to condensation of moisture from the air.

It is also an object of the invention to provide a cabinet structure which not only facilitates insertion of a container of ice cream and its removal when empty, but also facilitates the cleaning of the mechanism.

Other and further objects and advantages will appear from the following description taken with the accompanying drawings in which like characters of reference denote similar means in the several views and in which:

Figure 2 shows a front view of the upper part of the machine, and particularly illustrates the drive of the lifting rod for the ice cream mould and the pressure device.

Figure 6 is a horizontal section of the delivery device of a modified arrangement.

Figure 7 is a vertical section through this device. In both Figures 6 and 7 the lifting device serving for the feeding of the wafers from the lower lying storage container for the ice cream to the delivery opening lying at a higher level is shown in its upper position.

Figure 8 is a horizontal section through the device serving for the moulding of the moulded piece in this arrangement (line 8, 8 in Fig. 9).

Figure 9 is a vertical section through line 9, 9 of Fig. 8. In both Figures 8 and 9 the lifting device is shown in its lower position.

Figure 12 is an underside plan view of the plate covering the ice cream supply with the scraper and scraping knife attached to it.

Figure 13 is a plan view of the plate showing a modification of the scraper.

Figure 1:
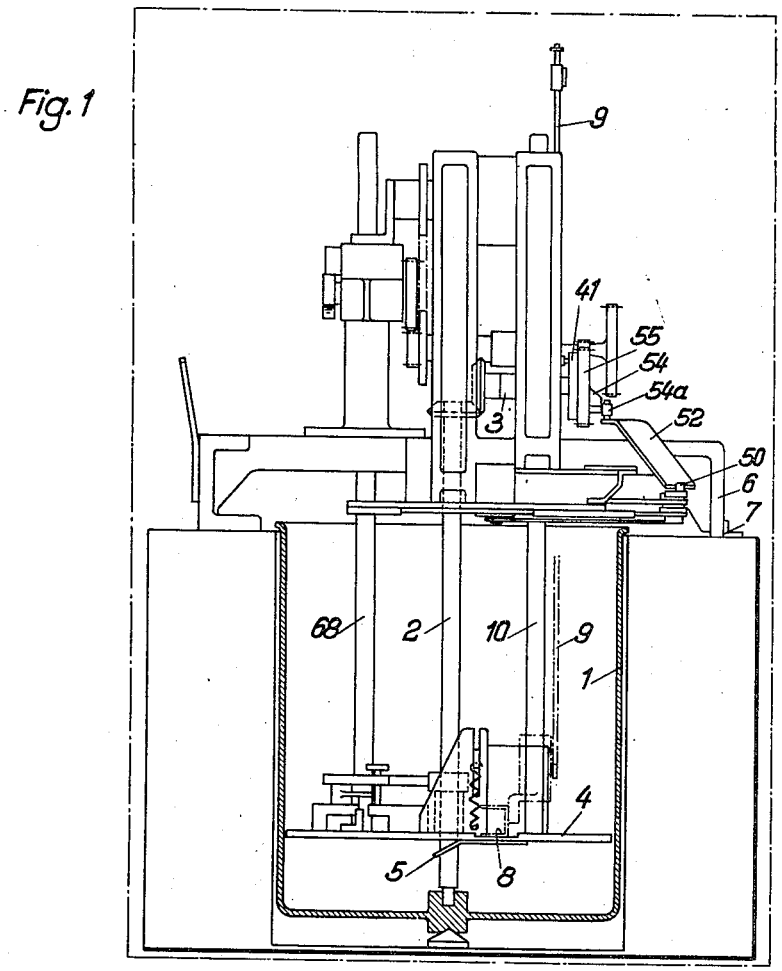
Figure 1 is a side elevation of one form of the machine according to the invention with the ice cream container shown in section; the components which are irrelevant to the present invention have been omitted for the sake of clarity. From this figure particularly the arrangement of the container for the piles of wafers and the wafer feeding device will be clear.
Figure 3:
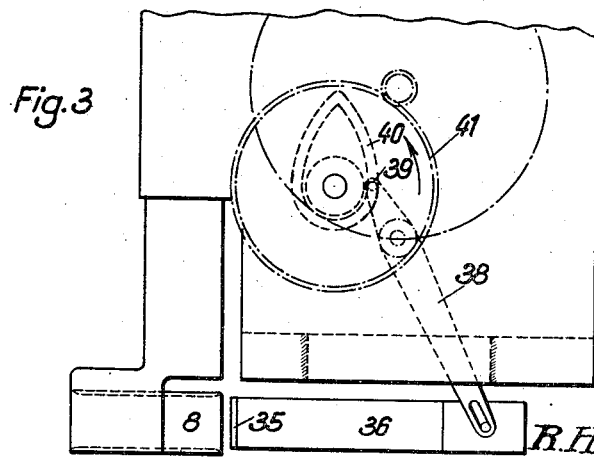
Figure 3 shows a detail, namely the drive of the expeller plate for the moulded piece of ice cream.

The device according to Figures 1 to 5 has a container 1 for the ice cream supply, which is set into rotation through the centre shaft 2 by a motor driven main shaft 3. The shaft 2 is divided approximately in the range of the upper edge of the container 1. The parts are coupled with one another by a square head or the like, so that the upper part of the device can be separated from the storage container together with the apparatus arranged on the plate 4 carrying the scraper delivery device 5 for the ice cream after having lifted the said plate 4. The frame 6 carrying the upper part is articulated by a hinge to the casing at 7 so that it can, with the apparatus arrange on it, be tilted through an angle of 90°.

By turning the ice cream storage container 1 the surface of the ice cream supply is moved below the scraper 5 so that the latter feeds the ice cream through an opening in the plate into a chamber (as 83 in Fig. 9) arranged on the plate. From this chamber the ice cream gets into the ice cream mould 8, shown in chain dotted lines, by the action of a pusher (84, Figs. 8 and 9). This ice cream mould is attached to a lifting rod 9 and can be lifted by means of the latter on a guide rod 10. A slotted crank 11 (Figure 2) serves for driving the said lifting rod. This slotted crank is articulated to the small block 12 at 13. In this block a wedge is arranged which is guided in the guide slots 14 by means of the pins 15 and is subject to the action of a spring which is arranged in the screw cap 16. This spring presses the wedge upwards and thus against the lifting rod 9, so that the lifting rod takes part in the movements of the block, by the action of the friction generated by the wedge. A spring 18 which serves as a buffer spring is arranged between an end plate 17 attached to the lifting rod 9 and the block 12. In the slotted crank 11 the block 19 is slidably arranged. This block is pivoted to crank 20 which is rigidly connected to the cam disc 21 by means of a shaft. On said shaft a two-armed lever 22 is freely rotatable and is rigidly connected to a sprocket wheel 23. On each arm of the said lever a pawl 24 is arranged. The pawls are biased towards the cam disc by springs 25, but are prevented from engaging it on part of their path by guide paths 26 which act on projections 27 of the pawls.

In Figure 2 the slotted crank is shown in the upper dead centre position. Shortly before reaching this position, the upper pawl 24 has made contact with the guide path 26 and has been rocked thereby in a clockwise direction so that it is freed from its engagement with the cam 28. At the same time the recess 29 of the cam disc 21 becomes positioned under the detent pin 30 so that this detent pin can engage with the recess 29 as by the action of a spring arranged thereon (not shown). Upon continued movement of the two-armed lever 22 the rear projection 27 of the lower pawl 24 is freed from engagement with the curved guide path 26 and consequently the front end comes into contact with the cam disc 21. After about half a revolution the guide path curve 31 which is attached to the pawl gets below the ring 32 of the detent pin 30 and lifts the detent 30 from the recess 29. At the same time the front face of the pawl 24 (which is the lower one in the drawing) comes into engagement with the cam shoulder 28 and turns the cam disc on in an anticlockwise direction, so that the block 19 of the slotted crank 11 passes the dead centre position and the lifting rod can drop downward by its own weight and carry the crank 20 and accordingly also the cam disc 21 with it which consequently overtakes the pawl 24.

Figure 4:
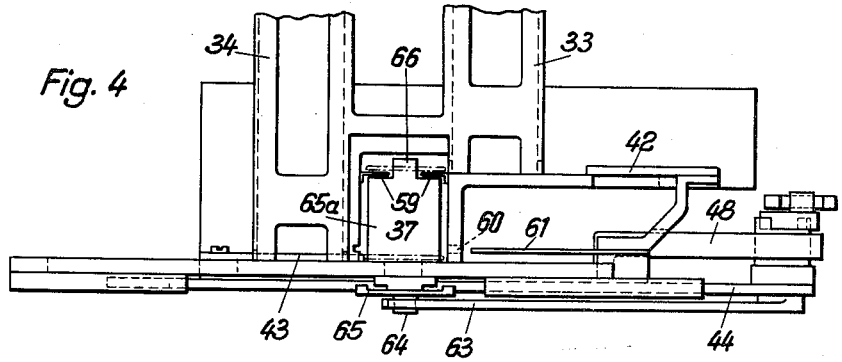
Figure 4 shows a lateral view of the feeder devices for the wafer shown in Figure 1 but on a larger scale.
Figure 5:
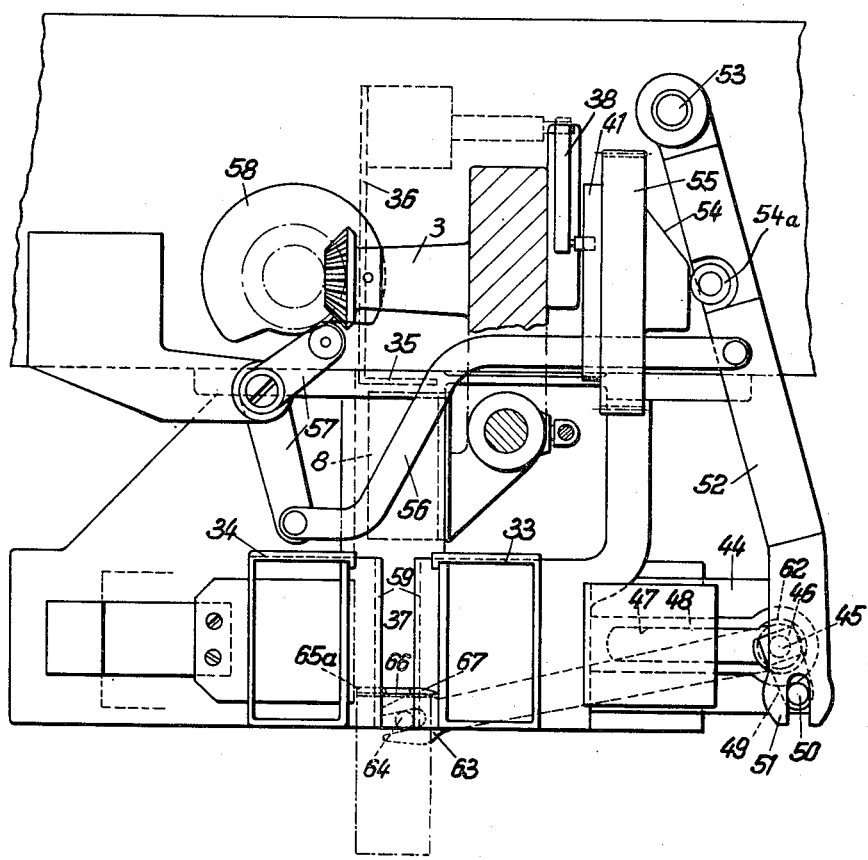
Figure 5 shows the device of Figure 4 in plan view.

As will be seen particularly from Figures 4 and 5, the containers 33, 34 for the piles of preferably rectangular oblong wafers are arranged outside the range of the lifting space of the mould 8. The mould 8 is shown in Figure 5 in chain-dotted lines. As soon as the mould 8 has reached its upper position, an expeller plate 35, which is arranged at the end of a driving rod 36, presses with one of its lateral edges the moulded piece of ice cream from the mould 8 into the receiving space 37. The push rod is moved by means of the two-armed lever 38 (see Figures 3 and 5). A pin 39 arranged on the shorter arm of said lever engages a curved groove 40 of a gear wheel 41 while the long arm of the lever is linked to the driving rod 36.

As soon as the expeller plate 35 has passed through the mould and emerges at its rear end, the mould 8 begins its downward movement by the action of the gear described hereinabove.

At the same time with the forward movement of the expeller plate 35 and accordingly of the moulded piece of ice cream the feeder members for the wafers serving for the covering of the moulded piece of ice cream are operated.

The slides 42 and 43 are arranged for serving as such feeder members, and are rigidly connected to the slide 44. In this slide a pivot pin 45 is journalled which carries a square head 46. This square head moves in its to-and-fro movement in the guide slot 47 of a plate 48 which is fixedly arranged on the frame. On the pivot pin a small crank 49 is arranged which engages by means of a bolt 50 the fork 51 of the lever 52 which is tiltably pivoted at 53 on the frame, and which is rocked to the right side in Figure 5 by means of the cam 54 of the gear wheel 55 acting on a roller 54a. By the cranked rod 56 and by the two-armed lever 57 as well as by the cam disc 58 the lever 52 is rocked back, viz. in Figure 5 to the left. During its movement to the left the slide 42 moves the lowermost wafer from the container 33 over the receiving space 37. The receiving space is covered on top by the edge strips 59 in such a manner that a slot remains free between the edge strips. The wafer comes to rest on these edge strips 59. Below, the plate 61 penetrates through the lateral slot 60 into the receiving space 37, and closes the receiving space 37 from below. During the aforesaid movement the slide 43, which in Figure 4 closes the container 34 from below, moves out of the container towards the left so that the pile of wafers can follow-up downwards. Upon the return movement of the lever 52 the slide 43 then pushes the lowermost wafer in front of it into the receiving space 37, in such a manner that it enters the space lying below the slide 61.

After the slide 61 has penetrated into the space 37, the moulded piece of ice cream is pushed by the expeller plate 35 into the receiving space 37 in the manner as described hereinabove. After the insertion of the lower wafer by the slide 43, the two wafers and the moulded piece of ice cream lie in the receiving space one above the other but separated from one another. At the moment when the slide 43 has reached its end position shown in Figure 5 the block 46 has moved from the longitudinal slot 47 into the circular enlargement 62 of the guide plate 48. At the continued rocking movement of the lever 52 to the right in Figure 5, the crank 49 turns in an anticlockwise direction and turns at the same time the arm 63 in the same sense of rotation. The forked end of the lever 63 embraces the bolt 64 of a slide 65 which is transversely shiftably arranged in the slide 44 carrying the expeller members 42 and 43 and which carries a vertically standing plate 65a. This plate 65a has an upper projection 66 which first is in juxtaposition to the gap between the edge strips 59 at its rear end and as soon as the slide 44 has reached the position shown in Figure 4. The plate 65a has shifted between the expeller plate 35 and the moulded piece of ice cream during the movement of the slide 44 from the left to the right, and has severed the moulded piece from the expeller plate 35 by means of its knife shaped chamfered front edge 67. As soon as the lever 63 rocks in the manner described hereinabove in an anticlockwise direction, the plate 65a is shifted into the receiving space 37. Its upper projection serves during this rocking movement for making the upper wafer to follow this movement. The slide 61 has previously left the receiving space so that it does not hamper the shifting of the plate 65a. The moulded piece of ice cream and two wafers covering it from above and from below are fed by the plate 65a into the delivery opening.

Figure 2 shows the pressure device mentioned hereinabove for the plate 4 covering the supply of ice cream. On the plate the guide rods 10 and 68 are attached. One of these guide rods is toothed at 69 and meshes with a gear 70 which is rigidly connected to the ratchet wheel 71. The ratchet wheel 71 cooperates with a pawl 72 which is longitudinally shiftable as for example against the action of a spring (not shown) in the two-armed lever 73. The springs 74, 75 engage the left arm of the lever 71. The lower spring 74 is attached at its lower end to the machine frame and the upper spring 75 is attached with its upper end to a lever 76. The rotating cam wheel 77 acts on the said lever so that it is rocked up-and-down. When rocking up, it tensions the spring 75 and the latter tends to move the lever 73 in a clockwise direction and thereby to move the rack 68 downward by means of the gear 70 meshing with it. As long as the supply of ice cream offers sufficient resistance to the plate, such downward movement does not take place. However a sufficient pressure is always maintained. As soon as the resistance diminishes owing to the reduced quantity of ice cream supply, the downward movement takes place.

In Figures 8 to 11 a pot 1 is shown arranged in the lower part of the casing 80, which pot is rotated by a suitable driving mechanism. A plate 4 is arranged in it which carries the scraper 5 and in which a rectangular cavity 83 is provided which is accessible from below through the opening 82. Into this cavity the ice cream is fed by means of the scraper 5 scraping the surface of the ice cream supply. The moulded piece of ice cream is passed to the feeding device by a piston 84. This piston 84 has a hook shaped extension 85 which encloses one transverse side and one longtiudinal side of the rectangular mould space 83. Adjacent to the cavity 83 there is the lifting plate 86 of the feeder device serving for the upward feed of the moulded piece of ice cream, when this lifting plate assumes its lowermost position, as shown in Figures 8 and 9. The piston 84 is moved fore-and-aft by the bell crank lever 87, 88 and the cam 90 which is provided with a roller 89. At the end of the forward movement it assumes the position shown in Figure 9 in which the moulded piece of ice cream 91 lies above the lifting plate 86.

In the lowermost position the lifting plate is secured by a device which will now be described.

In the bearing 92 the pivot pin 93 is journalled which has an arm 95 carrying the roller 94 and a second arm 96 attached to it. The roller 94 is rocked upward by the cam 97 against the action of the coiled spring 98. Thereby the arm 96 is pressed against the upper edge of the wall 86a, which is connected to the lifting plate 86 so that the lifting plate is held arrested in its lower position. A slide 102 is coupled with the arm 88 of the bell crank lever 87, 88 by a link 99 and by the two-armed lever 100 which is pivoted about the pin 101, so that upon rocking the lever 88 to-and-fro the slide 102 is moved fore-and-aft. Thereby it cleanses the space below the lifting plate from pieces of ice cream, pieces of wafers or the like which may have dropped into this space, and pushes them out through a slot 103 provided in the wall of the guide for the piston.

By the lifting device described more in detail hereinabove with reference to the Figures 1 and 2 the lifting plate is lifted, raising with it the moulded piece of ice cream, and arrives at the position represented in Figures 6 and 7.

The hub 104 slidably arranged on the pillar 10 carries the lifting plate 86 and the wall 105. On the latter a rocker lever 107 is pivoted by means of the pin 106, which lever carries at its lower part the pusher member 108 in the shape of a rectangular plate which serves for the pushing forward of the block of ice cream on the lifting plate. The pusher member is, in the lower position of the lifting plate 86, in the rear position as shown in Figure 9. During the last portion of the upward movement of the lifting plate 86 a projection 109 of the rocker lever 107 abuts against an adjustable stop 110, whereby the rocker lever is rocked forward into the position as shown in Figures 6 and 7, which rocking movement is effected as for example against the action of a spring (not shown). This could be a coiled spring arranged on the bolt 106. In the forward end position the lever is first secured by the snap-engagement of the pawl 112, by the action of the spring 111, behind the square head bolt 113. By the rocking forward of the lever 107 the moulded piece of ice cream is pushed from the lifting plate 86 on to the receiving plate 114 which has previously been covered by a wafer. The device for the feeding of this wafer and of the top covering wafer will be described later. Prior to rocking forward the lever 107, electrical contacts arranged on the lifting plate 86 between which is provided a resistance wire, can enter between corresponding contacts of the mains so that a short current impulse warms the lifting plate which facilitates the detaching of the moulded piece of ice cream from it.

Immediately after the pushing forward of the moulded piece of ice cream the lifting plate is lowered again and slides along the moulded piece when being lowered. Above the pusher plate 108 in its forward position a guide face 115 is arranged, the front of which forms a continuation of the front of the pusher plate 108. This slide face prevents any tilting of the moulded piece resting on the receiving plate 114 when the pusher plate 108 slides off said moulded piece. After part of the downward movement of the lifting plate 86 and of the guide face 115 the forward end of the pawl 112 abuts against the stop 116 which is rigidly attached to the machine frame. Thereby the pawl is made to release the square head 113 so that the lever 107 can return to its initial position, as shown particularly in Figure 9, as for example by the action of a spring (not shown).

The wafers which serve as a bottom layer for the moulded piece of ice cream are taken out of a storage container 117. The wafers which serve for covering the moulded piece from above are taken out of the storage container 118. The wafer which at a given time is lowermost in the said storage containers is pushed out by means of the slides 119 and 120 respectively. These slides are attached to the projections 121, 122, respectively, of a pusher rod 123. The pusher rod is moved to-and-fro by means of the cam 124 which acts on the rollers 126 and 127 pivoted on the bracket 125. For this purpose the bracket 125 is connected to the lever 130 by means of the pivot pin 129 attached to the arm 128. The lever 130 is in turn linked at 131 to the link 132, and, on the other hand, at 133 to the pusher rod 123. Upon shifting the pusher rod 123 to the right, a wafer is pushed from the wafer container 117 on to the receiving plate 114. Upon shifting the pusher rod 123 to the left the wafer which at the time is lowermost in the storage container 118 is shifted by means of the slide 120 on top of the moulded piece of ice cream which is now in the position as shown in Figure 7.

The shifting of the lifting plate 114 from the position between the wafer storage container 117 and the lifting plate 86 into the position according to Figure 6 takes place in this embodiment by means of a cam disc 41 which acts by means of a roller on the two-armed lever 38. This two-armed lever embraces with its end the pin 134 of the pusher rod 135 which is attached to the receiving plate 114.

Figure 11:
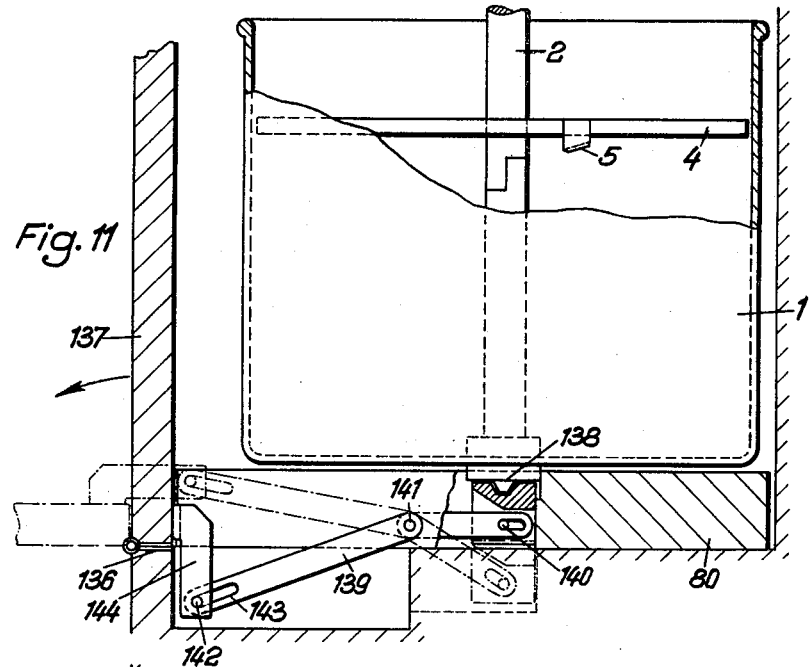
Figure 11 is a vertical section taken on line 11, 11 of Fig. 10, parts thereof being shown broken away.
Figure 10:
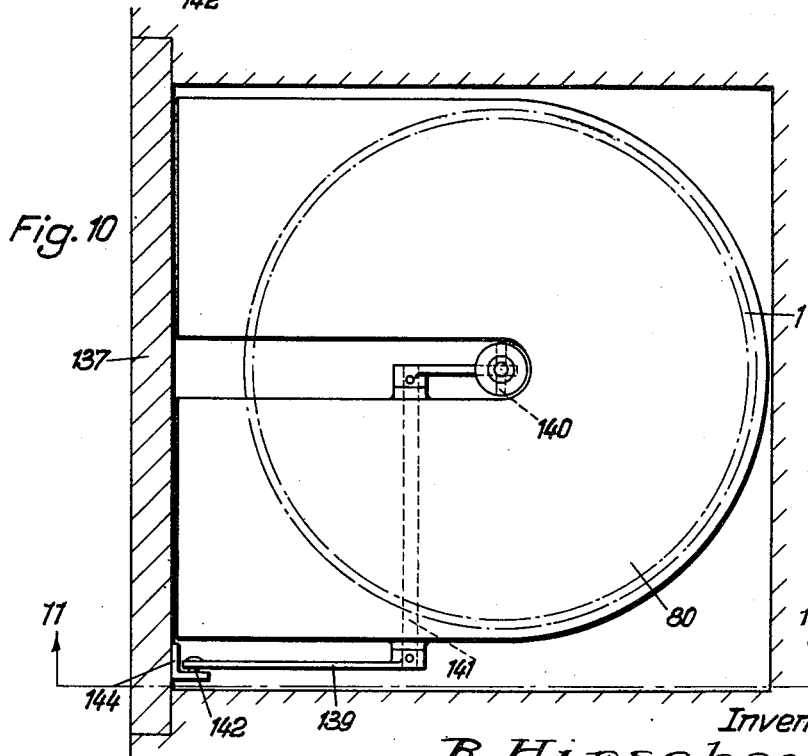
Figure 10 is a horizontal section through the lower part of the casing, enclosing the ice cream supply, of a machine provided with a lateral opening for the withdrawal of the ice cream pot.

The aforesaid pot 1 for the supply of ice cream is housed in the lower part of the machine casing 80 (Figures 10 and 11). After having opened a flap 137 obturating a lateral opening 136, the pot can be removed through this opening, after the plate 4 with the upper part of the shaft 2 has been lifted and the pot has been detached from said plate. By the opening of said flap 137 the bearing for the lower pivot pin 138 of the pot 1 is lowered, since this bearing is connected to the two-armed rocker lever 139 by means of a pivot pin 140, and the lever 139 which is pivoted about the stationary pin 141 is in turn articulated by means of the bolt 142 and the longitudinal slot 143 with the projection 144 of the flap 137. The open position of the flap and the associated position of the levers is shown in chain-dotted lines.

After the empty pot 1 has been withdrawn and a full pot has been pushed into the opening and the plate 4 and the upper part of the shaft 2 are lowered again, the bearing 138 is raised again by closing the flap 137. Thereby the bottom of the pot is lifted off the lower surface of the casing so that it can turn freely on the bearing.

Figure 12 shows the arrangement of the aforesaid tool designed in the shape of a knife 145 for keeping the face of the plate 4 free that rests on the supply of ice cream. The knife is fixedly arranged on the shaft 2 which rotates the pot containing the supply of ice cream, in such a manner that it scrapes the face of the plate 4. The scraper 5 arranged at the lower side of the plate which feeds the ice cream through the opening 82 of the plate into the moulding space 83 (Figure 9) is arranged at a distance from the plate, which is slightly larger than the thickness of the knife, so that the knife finds a passage between the scraper and the plate, and the excess ice cream can pass through the slot formed in the scraper. At an appropriate distance from the plate there is also arranged an edge scraper preceding the scraper 5. The gap between the rear edge of this edge scraper 146 and the scraper 5 feeding the ice cream into the mould serves also for the passage of the excess of ice cream scraped off the surface of the ice cream.

Instead of constructing the scraper 5 straight as shown in Figure 12, it can alternatively be constructed in the shape of wedges 147 adjoining one another, as shown in Figure 13. These wedges 147 leave passage 148 free between one another which likewise serve for the passage of excess ice cream.

It has also proved advantageous to arrange in the automaton above the pot a plate covering the entire cross section, which plate is merely provided with passages for the guide rods and for the lifting feeder device for the mould. By this plate the space enclosed below the pot is better protected from the irradiation of heat than by the plate 4 resting on the supply of ice cream.

While the invention has been described in detail with respect to now preferred examples and embodiments of the invention it will be understood by those skilled in the art that various changes and modifications may be made without departing from the spirit and scope of the invention and it is intended, therefore, to cover all such changes and modifications in the appended claims.

I claim:

1. A machine for the moulding and delivery of ice cream, comprising a rotatable bulk storage receptacle for ice cream, a plate so disposed therewithin, that its lower face is adapted to rest on the upper surface of a bulk of ice cream stored in said receptacle, a mould mounted on said plate, said mould having an opening lying in a plane normal to said plate, an opening through said plate, located adjacent the opening of said mould, a scraper arranged adjacent the lower sides of the plate underneath said opening in the plate and so shaped as to charge ice cream from said bulk, into said mould through said plate and mould openings, means to lift the charge of ice cream from the mould, said means being arranged upon the upper side of the plate and including a vertically movable base plate, a receiving chamber at the upper position of said lifting means for receiving said charge of ice cream, an ejector to convey the charge of ice cream from said lifting means into said receiving chamber, means to return said lifting means to its lower position immediately after the charge of ice cream has been ejected into said upper receiving chamber, at least one container for wafers to be applied to the charge of ice cream, and means for pushing wafers into position above and below said charge of ice cream in said receiving chamber.

2. A machine as claimed in claim 1 characterised in that the container of wafers for the covering of the charge of ice cream from the top and from the bottom is arranged outside the path along which the charge is lifted.

3. A machine according to claim 2 characterised in that said wafers are of oblong shape and the means for pushing the oblong wafers from the container towards the charge of ice cream act on the longer edges of the wafers.

4. A machine according to claim 3 characterised in that the means for pushing the lower and the upper wafer towards the charge of ice cream are consecutively operated by one and the same operating member.

5. A machine according to claim 1, having means to exert downward pressure on said plate including a pawl driven ratchet, and means including a resilient connection to actuate said pawl.

6. A machine according to claim 1, in which said means for pushing wafers is so related to the sequence of operation of the machine as to convey a wafer to position to be below said charge of ice cream prior to ejection of said charge to said upper receiving chamber.

7. A machine according to claim 1, having a heating device for said lifting means at its upper position whereby detachment of the charge of ice cream from said lifting means is facilitated.

8. A machine according to claim 1, characterized by a scraper arranged in the range of the outer rim of the plate resting on the ice cream and operating on the edge of the ice cream, this scraper being arranged at a distance from the scraper arranged underneath said opening, said two scrapers being so spaced with relation to each other as to provide a passage for ice cream therebetween.

9. A machine according to claim 1, in which a knife is provided rotatably mounted to rotate with said bulk storage receptacle and bearing on the under surface of said plate, said scraper arranged underneath said opening in said plate being so mounted that said knife passes between it and said plate whereby the entire surface of said plate touched by said knife is scraped at each revolution of said receptacle.

10. A machine according to claim 1, in which the actuating means for the lifting means is constructed in such a manner that when the means to lift the ice cream has been lifted to its uppermost position it is automatically disengaged with relation to the lifting means so that upon ejection of the charge of ice cream into said receiving chamber said means to lift the ice cream is dropped for free fall into its lower position.

11. A machine according to claim 1, having means for lifting said plate so that the bulk storage receptacle may be removed and replaced.

12. A machine according to claim 11, in which a casing having a lateral opening is provided, said lateral opening being located to provide access for lateral insertion and removal of said bulk storage receptacle, and a bottom hinged flap closure for said opening.

13. A machine according to claim 12, in which said rotary bulk storage receptacle is provided with a central downwardly extending pivot pin, a bearing for said pivot pin vertically movable in the machine below said pivot pin when said rotary bulk storage receptacle is in place in the machine, and means to raise and lower said bearing whereby said receptacle may be raised for engagement with the machine or lowered for removal from the machine.

14. A machine according to claim 13, having means coupling the lifting device with the closure flap for the said lateral opening in such a manner that the lifting is automatically effected when closing the closure flap.

15. A machine according to claim 11, in which the plate, scraper, mould, lifting means and actuating means are mounted on a common support hinged to said machine so that it may be swung 90° whereby ready access may be had to those parts for cleaning.

16. A machine according to claim 12, characterized in that on top of the casing receiving the rotatable bulk storage receptacle of ice cream a heat screening plate is so arranged as to cover the entire interior space of the casing, which screening plate has only passages for the driving shaft, the guide rods and for the device for the feeding upwards of the charges of ice cream.

17. A machine as claimed in claim 1, including a receiver plate forming the bottom of said receiving chamber, a first wafer container, means for pushing a wafer from said first wafer container onto said receiver plate, means for moving said receiver plate with the wafer and the charge of ice cream in a direction at right angles to the direction in which the charge of ice cream was ejected from said lifting means into said receiving chamber toward a second wafer container, and means for pushing a wafer onto the top of said charge of ice cream.

18. A machine according to claim 17, characterized by means simultaneously moving the piece of moulded ice cream and the wafers into a delivery position.

19. A machine according to claim 1, in which a rotary knife is provided which scrapes the lower surface of said plate to prevent adhesion between said plate and the ice cream in said storage receptacle.

20. A machine according to claim 19, characterized by the arrangement and construction of the device for rotating the scraper in such a manner that the action of the scraper feeding the ice cream into the mould is periodically interrupted.

21. A machine according to claim 1, in which said means to lift the charge of ice cream includes a rod operated by a crank and slotted lever, said crank being operated by a ratchet whereby when said crank passes the top dead center the lifting means will overrun the ratchet to return the lifting means to its lower position.

22. A machine according to claim 21, characterized in that the lifting rod is locked in the upper dead center position by a detent acting on the ratchet wheel and operated by the driving members.

23. A machine according to claim 21, characterized in that the connection of the lifting rod to the crank and slot is made yieldable by a friction connection, so that with a constant length of stroke of the lifting member the effective height of lifting is automatically adapted to the actual distance of the surface of the supply of ice cream from the delivery point.

24. A machine according to claim 1, including a reciprocating pusher member carried by said plate and forming a part of said mould, the forward motion of said pusher moving a charge of ice cream from said mould to said lifting means, said pusher being latched in its forward position during the lifting and return of said lifting means.

25. A machine according to claim 24, characterized in that on the pusher serving for the feeding of the charge of ice cream from the mould, which latter is filled by means of a scraper scraping the surface of the ice cream, a hook-shaped projection is arranged with encloses a transverse and longitudinal side face of the mould.

26. A machine according to claim 25, characterized in that the bottom plate is adapted to be locked in its receiving position.

27. A machine according to claim 26, characterized by a slider arranged for cleaning the space below the lowermost position of the bottom plate.

References Cited in the file of this patent
UNITED STATES PATENTS
2,136,505   Hirschson _____ Nov. 15, 1938